Dec. 22, 1931.  G. A. STACKHOUSE ET AL  1,837,634
ELECTRIC SWITCH
Filed March 25, 1929
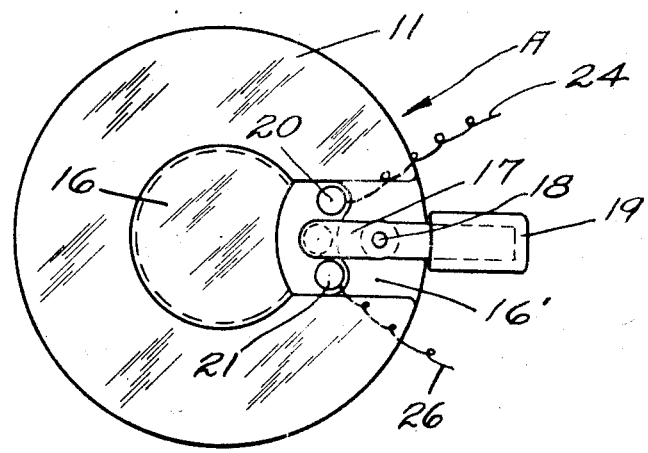
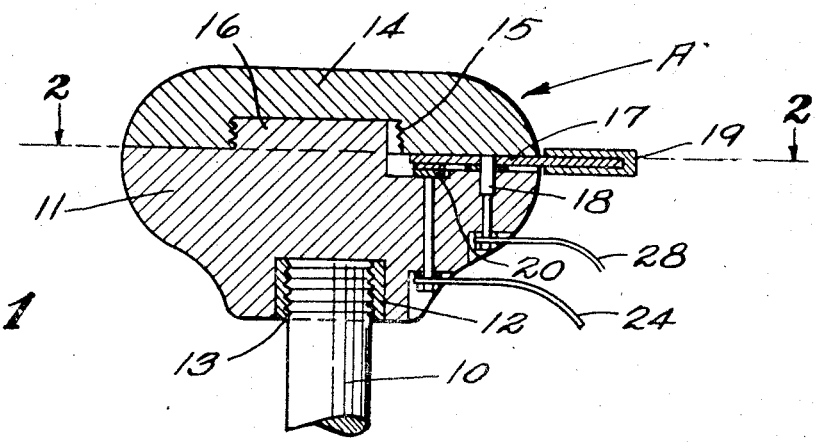
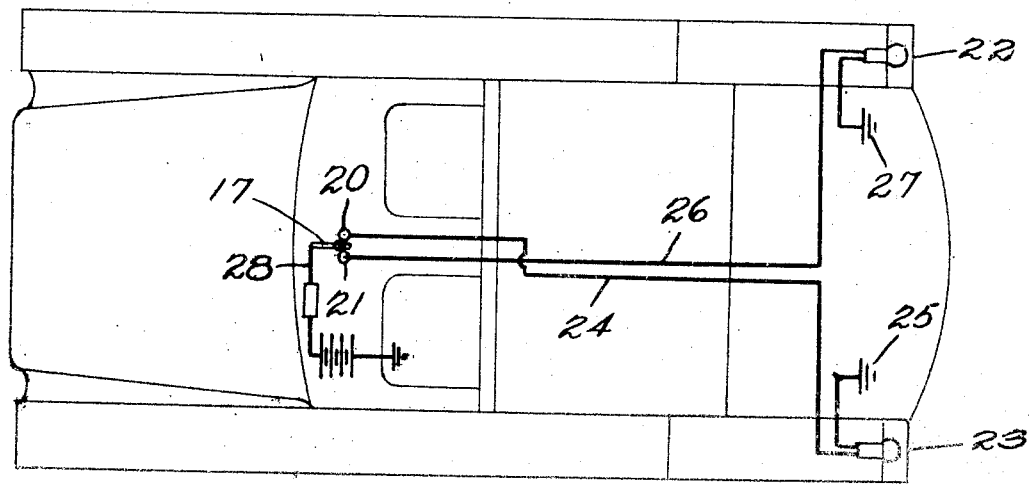
INVENTORS
George A. Stackhouse
Edward C. Falls
BY Harry C. Schroeder
ATTORNEY Patented Dec. 22, 1931

1,837,634

UNITED STATES PATENT OFFICE

GEORGE A. STACKHOUSE AND EDWARD C. FALLS, OF OAKLAND, CALIFORNIA

ELECTRIC SWITCH

Application filed March 25, 1929. Serial No. 349,750.

The specification forming a part of this application for Letters Patent for improvements in electric switches as illustrated in the accompanying drawings, which are made a part of the application, is directed to the embodiment of the invention in its preferred form. Like reference characters as employed in the specification and placed upon the drawings indicate like parts throughout the several figures of the drawings.

The primary object of the invention is the provision of an electric switch within the hand grip or ball of a gear shifting lever of an automobile.

A further object of the invention is to so locate the operating finger for the switch in such a position that it can be readily moved for controlling the usual signal lights attached to the rear of an automobile.

A further object of the invention is to construct a device of the character indicated which will be simple in construction, easy of operation and inexpensive of manufacture.

For a clearer and more comprehensive understanding of the invention reference may now be had to the detailed description thereof in the following specification taken in conjunction with the accompanying drawings, in which:

Figure 1 is a transverse vertical section through the hand grip affixed to the upper end of a gear shifting lever of an automobile, the lever being shown in full lines.

Figure 2 is a horizontal sectional view taken on line 2—2 of Figure 1 showing electric terminals and contacting member for making and breaking the circuit.

Figure 3 is a top plan view of an automobile having the cover removed showing the schematic plan of the circuit wiring.

Reference character 10 indicates a gear shifting lever of the ordinary construction commonly used for shifting the gears of an automobile. The hand grip A is composed of the lower section 11 which is provided with internally screw-threaded bore 12 for screw-threaded engagement therewith of lever 10 as indicated at 13. The upper portion 14 of the hand grip is provided with an internally screw-threaded bore 15 for screw-threaded engagement with the externally screw-threaded boss 16 of section 11.

It will be understood that sections 11 and 14 are made of any suitable non-conducting material such, for instance, as glass or hard rubber. Section 11 has recess 16' in the upper face thereof for the purpose of providing a guideway for the swinging of contacting member 17 which is pivoted to the section 11 as by pivot pin 18 and an insulated sheave 19 is provided for the protruding end of a finger grip for moving the contacting member into engagement with terminals 20 and 21 for the operation of signal lights 22 and 23 at the rear of the automobile. Wire 24 proceeds from terminal 20 to light 23 and through ground 25 at the rear of the automobile while wire 26 proceeds from terminal 21 to light 22 and through ground 27 at the rear of the automobile. Pivot pin 18 is provided with circuit wire 28.

Having thus described our invention, what we claim is:

1. An electric switch comprising a two part knob structure in screw threaded engagement, one of said parts having a threaded concentric extension and a switch mechanism receiving recess extending radially therefrom, a pair of switch contacts in said recess, and a switch lever pivotally mounted adjacent the periphery and adapted to make circuit with either of said contacts.

2. An electric switch comprising a two part circular knob consisting of a body member with a concentric threaded boss and a cover member threadedly cooperating therewith, said knob being of substantially elliptical cross-section, said body member having a concentric depending boss with threaded aperture, the top surface having a recess formed therein and extending radially from said threaded boss, electric contacts spacedly fixed in said recess, a lever pivotally mounted in coacting relation to said contacts and having a handle protruding from the periphery of said knob, said knob being formed of insulating material.

In testimony whereof we have affixed our signatures.

GEORGE A. STACKHOUSE.
EDWARD C. FALLS.